March 21, 1961 V. H. ASKE 2,976,478

VARIABLE PERMEABILITY MAGNETIC CIRCUIT

Filed March 16, 1956

*INVENTOR.*
Vernon Harold Aske by Alan K. Roberts

ATTORNEY 2,976,478
Patented Mar. 21, 1961

2,976,478

VARIABLE PERMEABILITY MAGNETIC CIRCUIT

Vernon Harold Aske, Huntington Station, N.Y.
(3415 Arbor Lane, Hopkins, Minn.)

Filed Mar. 16, 1956, Ser. No. 572,002
9 Claims. (Cl. 323—56)

This invention relates to magnetic components and, more particularly, to improvements in magnetic circuits which enable the characteristics thereof to be varied in controlled manner and to associated methods.

Magnetic components and circuits have been substituted in many instances for mechanical, electro-mechanical and electronic devices to achieve a greater proficiency in reliability and for many other reasons including size, cost, and reduction of heat dissipation.

An object of the invention is to realize the various advantages of magnetic devices in an improved magnetic circuit by utilizing magnetic principles in a new and unusual manner as will hereinafter be described.

Known magnetic devices have been widely accepted chiefly by reason of the aforestated advantages. Never-the-less, these devices are subject to improvements of certain characteristics not the least of which is the signal to noise ratio.

Accordingly, a further object of the invention is to provide an improved magnetic circuit which enjoys an excellent ratio of signal to noise without interfering with any of the other characteristics of the circuit and without materially affecting the costs and ease of manufacture.

A preferred embodiment of the invention will be shown as a magnetic modulator or, in other words, as a magnetic device which changes a direct-current signal into a phase-sensitive proportional alternating-current voltage whose frequency is that of a predetermined excitation signal.

Briefly, the invention, in accordance with one embodiment thereof, utilizes principles involving changing the permeability of a magnetic circuit in response to one of the signals involved. This change in magnetic circuit characteristics is then used to effect a change in the other signal which is passed through the circuit.

A feature of the invention, as will be shown, is the arrangement of the various portions of the magnetic circuit so as to isolate the sources of the various signals from one another; and, for this reason, the invention has the further advantage of providing a magnetic device which is substantially insensitive to the signal sources or other circuits which may be coupled thereto.

Another advantage of the inventioin, as will be evident, is that it provides circuits having a wide dynamic range whereas known circuits, intended to perform similar functions, are characterized by a severe attenuation of output signal with sizable increases in the magnitude of input signals applied.

Other advantages of the invention include an excellent fidelity in reproduction of wave forms, the flexibility of application, dependability, constructional simplicity, and the absence of hysteresis effects.

Other objects and advantages of the invention will be pointed out in the following description and claims and illustrated in the accompanying drawings which disclose the principles of the invention and the best mode which has been contemplated of applying those principles.

In the drawing:

Figure 1 diagrammatically illustrates a magnetic-mechanical device by which certain of the principles of the invention are explained.

Figure 2 is a graph illustrating a hysteresis loop by means of which additional principles of the invention are explained.

Figure 3 schematically shows one embodiment of the invention.

Figures 1, 2, 3, 4, 5, 6:
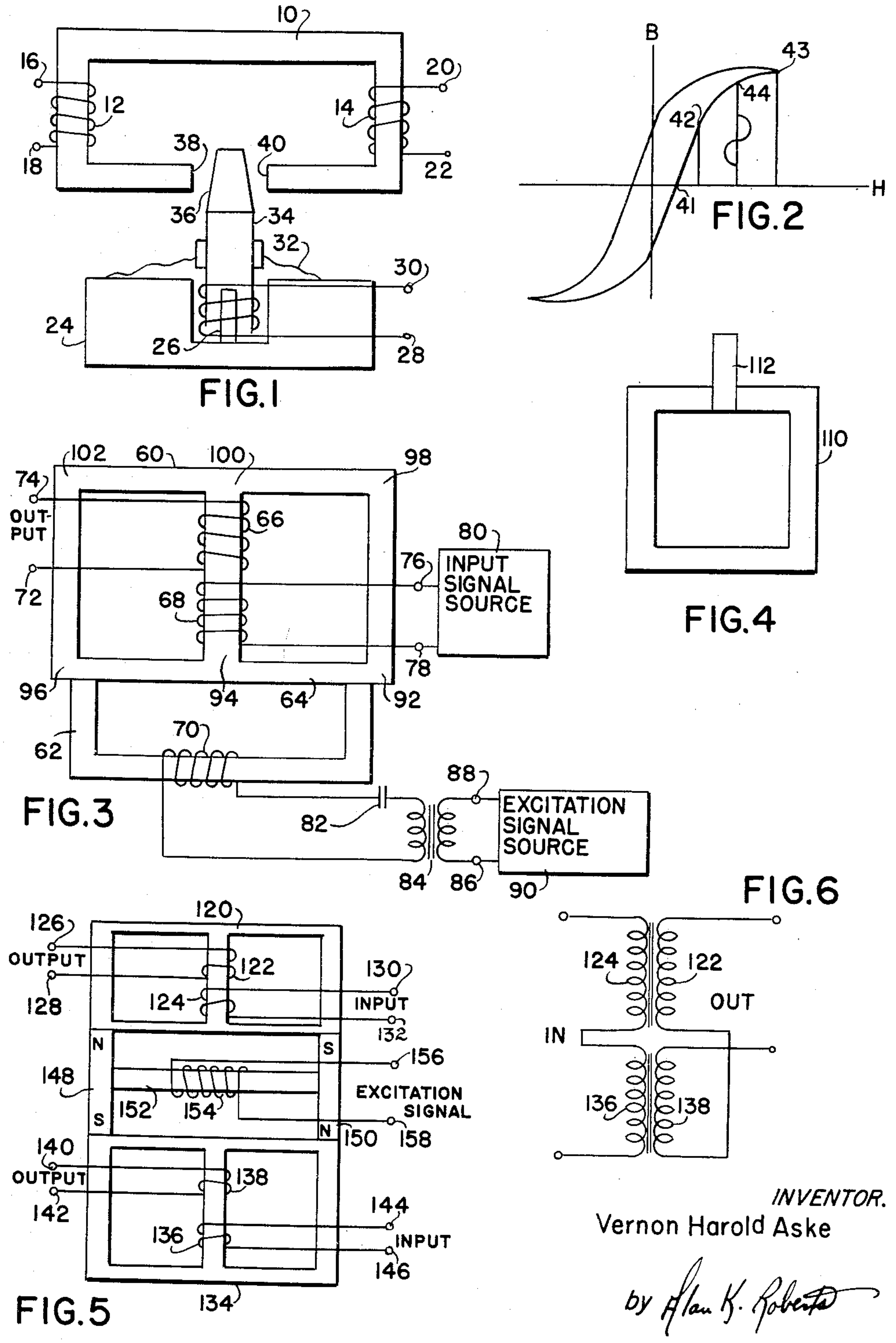
Figure 4 shows a modification which can be incorporated into the device of Figure 3.
Figure 5 represents a preferred embodiment of the invention wherein special precautions are employed to isolate the various signal processing means used in connection therewith.
Figure 6 schematically illustrates a system for the connection of the windings of Figure 5 for improving the isolation of the various signal processing means.

In Figure 1, apparatus is shown for varying the permeance of a magnetic circuit. The magnetic circuit is constituted by a magnet 10 of suitable material arranged with an air gap having a particular purpose as will be shown. An input winding 12 and an output winding 14 are wound on the core or magnet 10 to provide means for generating flux in the magnet 10 and for deriving output signals from changes in flux in the magnetic circuit in known manner. The terminals 16 and 18 are provided for introducing signals into the winding 12 and the output signal can be coupled to a utilization device via the terminals 20 and 22.

Electro-mechanical means are provided for varying the permeance of the magnetic circuit and include a magnetic speaker system including an excitation winding 26 which receives signals impressed across the terminals 28 and 30. The speaker system further comprises a diaphragm 32 connected to the element 34 which supports a magnetizable element 36. The magnetizable element 36 is positioned between the faces 38 and 40 of the magnet 10 and defines an air gap in the magnetic circuit. In known manner, a signal impressed across the terminals 28 and 30 cause a field to be set up by the windings 26 which field causes the element 34 to be moved. This motion is enabled by reason of the flexible quality of the diaphragm 32. Accordingly, the magnetizable element 36 is inserted or withdrawn from the air gap of the magnetic circuit in varying degrees according to the strength of the signal.

The permeance of a magnetic circuit having an air gap is determined to a large extent by the dimensions of the air gap. For example, the longer the air gap in a magnetic circuit, the less is the permeance of that circuit. This may be attributed to the fact that air is a poorer "conductor" of magnetic flux than is the remainder of the magnetic circuit which is an appropriately selected magnetic material.

As a result, the permeance of a magnetic circuit can be effectively controlled by controlling the dimensions of its air gap. Thus, with the element 36 fully inserted into the air gap of the magnet 10, the permeance of the magnetic circuit formed thereby is at a maximum. Conversely, with the magnetic element 36 fully withdrawn from the air gap, the permeance of the magnetic circuit is at a minimum. The reluctance of the magnetic circuit or the resistance presented to magnetic flux varies inversely to the permeance.

From what has been said, it can be seen that the flux established in the magnet 10 is a function not only of the signal impressed upon the winding 12 via the terminals 16 and 18 but also of the reluctance of the magnetic circuit as controlled by means of the position of the magnetic element 36. The invention utilizes this dual control as one of its basic principles for providing new and useful devices.

Considering next, by way of example only, a modulating system, it will be recalled that a function thereof is to vary a first signal in accordance with a second. Thus, intelligence expressed in the form of a varying direct current signal may be modulated with an alternating current signal for purposes of transmission.

Normally, a direct current signal impressed across the terminals 16 and 18 would, if of a varying magnitude, cause the winding 12 to set up a variable magnetic flux in the magnet 10 which flux would be proportional to the signal. The flux can, however, be varied in accordance with the dimensions of the air gap as has been noted.

It will be appreciated that it is possible to vary the dimension of the air gap proportionally to the magnitude of the excitation signal applied to the winding 26 via the terminals 28 and 30. Thus, it is found that by appropriately shaping the element 36 it is possible to sinusoidally vary the reluctance or permeance of the magnetic circuit in response to a sinusoidal excitation signal. The flux which results in the magnetic circuit is therefore a result of the varying direct current signal and the alternating current signal applied respectively across the windings 12 and 26. The resulting flux causes voltages to be generated in the winding 14 which voltages are modulated signals.

The device which has been described is an electromechanical structure which performs its function chiefly due to the control exercised on the magnetic properties of the associated magnetic circuit. The device does however include a movable mechanical element and is thus subject to one of the objections which has been made with respect to the prior art. The invention, however, utilizes further principles to avoid this possible objection.

To avoid the objection as to the inclusion of movable parts, the invention contemplates the substitution of certain magnetic phenomena. To explain some of the principles involved, reference is next made to the graph shown in Figure 2 wherein is illustrated the hysteresis loop of a typical magnetic material. The coordinates of the graph are magnetomotive force H as results from the passage of current through a winding on a magnetic core and the resultant flux B. As is known, incremental permeability of the material is calculated from the expression $dB/dH$.

Considering then the permeability of the material during the operating conditions shown between points 41 and 42 on the loop, it can be seen that the incremental permeability is constant—that is, $dB/dH$ is constant and there is no change in the slope of the curve. Between points 42 and 43, however, a different condition exists. Point 43 is at or substantially at the point of saturation of the magnetic material with flux. Between points 42 and 43, the rate of increase of flux decreases with equal increases of magnetomotive force H. Accordingly, in this region there is a change in the permeability of the material.

Many materials available will in fact exhibit arcuate sections corresponding to the section between points 42 and 43 which arcuate sections are substantially arcs of a circle. These sections are, in other words, quarter-circles which are characterized by a constant rate of change of slope. Significantly, this means that these materials have operating ranges within which their permeabilities change at a constant rate. The invention contemplates operating within these ranges to vary permeability proportionally to an excitation signal.

To more specifically illustrate the principle, a sinusoidal signal is shown varying about a reference or bias line 44. This signal, which may be any time-varying signal, can be of any magnitude within the coordinates including points 42 and 43 and still be within the range in which permeability has a constant rate of change. Thus, with the number of turns in the winding of the core fixed, the permeability will vary proportionally to the signal applied. In the illustrated situation, the permeability of the material is varied as a sinusoidal wave.

The invention utilizes this characteristic as a substitute for the electro-mechanical system previously described and it has been found that normal departures from a constant rate of change in the subject portion of a hysteresis loop do not materially affect the performance of the associated device.

Figure 3 illustrates one embodiment of the invention in which the last described principle of the invention is employed. The embodiment comprises the magnetic cores 60 and 62 which have a common portion or leg 64. It will be noted that there is no air gap although an air gap can be provided without interfering with the operation of the device.

The magnetic core 60 is shown as being a three-legged core such as is used for numerous types of transformers. Windings 66 and 68 are provided on the central leg. The winding 66 is utilized as an output winding and is coupled to the terminals 72 and 74. The winding 68 is used as an input winding and receives signals impressed across the terminals 76 and 78. A winding 70 is provided on the magnetic core 62 and serves as an excitation winding in a manner hereinafter more particularly described.

An input signal source 80 is coupled to the terminals 76 and 78. In a modulator, the input signal source 80 produces an intelligence signal in the form of a varying direct current voltage. If a mixer is desired, the input signal source 80 would be the source of an alternating current voltage.

Other voltages which are applied to the device are introduced through a circuit comprising the battery or direct current voltage supply 82, the transformer 84, and the terminals 86 and 88 which couple the transformer 84 to an excitation signal source 90. The excitation signal source 90 is the source of a time-varying signal which for illustration purposes will be considered as being sinusoidal.

The apparatus thus includes, for performing its functions, a first magnetic circuit including the core 60 and its associated windings 66 and 68 and a second magnetic circuit including the core 62 and its associated winding 70. The magnetic circuits share the common path or leg 64, and it will be appreciated that it is the first magnetic circuit which in fact constitutes the normal input and output means.

By appropriate design, the magnetic core can be constructed so that the leg 64 contributes most materially to the permeance or reluctance of the first magnetic circuit. This is desirable but not essential to the invention. Hence, if the permeance and reluctance of the leg 64 can be controlled in a manner as was shown with respect to the previously described electro-mechanical device, a means for varying one signal in accordance with another has been provided. For this purpose, the principle discussed with reference to the hysteresis loop is employed.

The battery or source of direct current bias 82 is selected to provide a magnetomotive force in the winding 70 such that an excitation signal when applied will operate within the quarter-circle range of the hysteresis loop of the material used. This material may be, for example, of high nickel content such as HY MU 80. Thus, the excitation signal provided by the signal source 90 will cause the permeability of the leg 64 to vary in sinusoidal fashion as will also the reluctance. As a result, the reluctance of the path of the flux caused by the signal originating in the input signal source 80 will vary sinusoidally and the resultant signal generated in the winding 66 will be influence by the excitation signal in addition to the input signal. Extremely good results have been achieved and the conclusions which have been noted are not merely matters of hypothesis.

It will be understood that the function of the second magnetic circuit including the core 62 is to vary the permeability of the first magnetic circuit including the core 60. Of necessity, flux from the core 62 will circulate through the leg 64. It is undesirable, however, that this flux be linked to the windings 66 and 68. Thus, for example, if the input signal source 80 were a low impedance source, considerable current due to the excitation signal might be induced to flow through the source 80 with deleterious results upon the performance of the device.

To offset this possibility, the core 60 is constructed in bridge-like fashion, one of which is shown by way of example. For purposes of description, the core 60 has been further designated by the points 92–102. By appropriate design including the lengths of the paths and the areas thereof, the magnetic "drops" from point 92 to 94 and from point 92 to 98 to 100 can be made equal. Similarly, the magnetic drops from point 96 to 94 and from point 96 to 102 to 100 can likewise be made equal. The effect of this arrangement is that flux induced or coupled into the first magnetic circuit from the second magnetic circuit has no effect on the central leg of the core 60 on which are wound the windings 66 and 68. Hence, although the second magnetic circuit substantially controls the reluctance in the first magnetic circuit, it contributes nothing to the signals in the windings 66 and 68 and effectively the excitation signal source has been isolated from the other signal carrying members of the device.

Considering, briefly, Figure 2 in conjunction with Figure 3, an interesting feature of the invention is that the parameters can be selected so as to easily avoid undesirable hysteresis effects. Stated otherwise, it is possible to select the bias of the second magnetic circuit and a magnitude of excitation signal whereby the magnetic material is repeatedly brought to its saturation level with each positive swing of the excitation signal. In this manner, the device can be used free from the effects of residual magnetism which may otherwise cause a shift in characteristics. It is to be noted, however, that this problem has not been encountered in practice.

It has been stated that the magnetic core 60 can be constructed as a magnetic bridge to isolate the various signal means associated with the device. Another structure for performing this function may take the form shown in Figure 4.

In Figure 4, the cores 110 and 112 which constitute the coupled magnetic circuits are arranged angularly with respect to one another. Specifically, the cores 110 and 112 are arranged perpendicularly to each other. Assuming, for illustration, that the magnetic core 112 is used for the purpose of influencing the permeance of the loop constituted by the core 110, it is seen that a portion of core 112 occupies the "air gap" of core 110. As a result, the permeance of core 112 (or that portion of core 112 included in the loop of the core 110) contributes to the permeance or reluctance of core 110. Core 112 is therefore operated under the conditions previously described to effect the same results. With the angular disposition, however, little flux is coupled from one magnetic circuit to the other and no further precautions must be observed for purposes of isolation.

One precaution should be observed, however, with respect to this latter construction and this involves the selection of materials. Care should be taken that the materials selected are not capable of grain orientation in which event the permeability of the one core will have little or no effect upon the other.

It will now be recalled that in order to bias the previously described devices to the desired operating point, a source of direct current voltage was employed. A preferred embodiment of the invention utilizes permanent magnets to accomplish the same result. This embodiment is illustrated in Figure 5 and, as will be shown, incorporates the additional advantage of avoiding the generation of signals in the input and output windings due to time-varying flux caused by these windings.

The device shown in Figure 5 comprises a core 120 provided with the windings 122 and 124. The winding 122 is coupled to the terminals 126 and 128, and the winding 124 is coupled to the terminals 130 and 132. A similar core 134 is provided with the windings 136 and 138. The winding 138 is coupled to the terminals 140 and 142 and the winding 136 is coupled to the terminals 144 and 146. The terminals 126, 128, 140 and 142 are coupled to output windings whereas the terminals 130, 132, 144 and 146 are coupled to input windings.

For the sake of simplicity, the cores 120 and 134 are constructed in a bridge-like arrangement as has been previously discussed and are further arranged with their respective windings 122, 124, 136, and 138 to operate as has been described. These magnetic circuits are however biased by the use of permanent magnetism.

The permanent magnetism is provided by the use of permanent magnets 148 and 150 polarized as indicated in the drawing. Further, a core 152 is coupled to the permanent magnets 148 and 150 in a magnetically continuous circuit. To provide the excitation signal, a winding 154 is placed on the core 152 and is coupled to the terminals 156 and 158 to which is coupled a source of excitation signal.

It is to be noted that the flux due to the magnets 148 and 150 is in series and flows in opposite directions through the magnetic circuits including the cores 120 and 134, respectively. On the other hand, the flux due to the excitation signal flows in the same direction through the two magnetic circuits. One magnetic circuit thus has a low incremental permeability and the other has a high incremental permeability. Arrangements can also be provided wherein no flux due to the excitation signal flows through the permanent magnets.

The windings 124, 136 and 122, 138 are connected as shown in Figure 6 with the output windings being connected in series opposing and the input windings connected in series aiding. Application of direct current signals will result in voltages which will add in the output circuit and oppose each other in the input circuit. In the case of perfectly balanced cores, no alternating current voltage will appear at the input circuit and the input circuit will have a desirable independence. Thus, a push-pull arrangement is advantageously incorporated into the device.

The invention has been illustrated embodied in various modulating devices, but it will be understood that the principles are equally applicable to mixers, amplifiers and other circuits in which it is desirable to influence one signal by another. It will be further understood that principles of the invention can be utilized in any device in which a controlled variation of permeability or reluctance can be intelligently employed and the resultant device will achieve many of the advantages of the invention.

Devices of the invention have been constructed and tested with results proving the utility of the invention. For example, the device of Figure 5 was tested with a 400 cycle, 6.3 volt excitation signal with a resultant noise figure of .6 millivolt R.M.S. and outputs as follows: 6 millivolts R.M.S. for a .4 microamp direct current input; 60 millivolts R.M.S. for a 4 microamp direct current input; and 800 millivolts R.M.S. for a 48 microamp direct current input. The device of Figure 3 was tested with a 400 cycle, 6.3 volt excitation signal with a resultant noise figure of 15 millivolts R.M.S. having output signals of 30, 220, and 1,000 millivolts, respectively, for input signals of .4, 4, and 48 microamps. These results are examples only of numerous tests during which no hysteresis difficulties were encountered.

The devices of the invention have been found to be very dependable, to give very good wave forms, to have excellent signal to noise ratios, and to be very flexible with respect to the selection of operating conditions. These devices are, of course, constructionally simple.

There will now be obvious to those skilled in the art many modifications and variations utilizing the principles set forth and realizing many or all of the objects and advantages of the apparatus described but which do not depart essentially from the spirit of the invention.

What is claimed is:

1. A magnetic device comprising a first magnetic circuit, a second magnetic circuit having a portion in common with said first magnetic circuit, means for feeding a signal to said second magnetic circuit to vary the permeability of said first magnetic circuit, and windings coupled to said first magnetic circuit for input and output signals, said first magnetic circuit being arranged as a magnetic bridge to render flux coupled into said first magnetic circuit from said second magnetic circuit ineffective at said windings; said first magnetic circuit comprising a closed three-legged core of magnetic material.

2. A magnetic device with controllably variable permeance comprising a first magnetic core with three legs, input and output windings on one of said legs and mutually coupled by varying flux on the core, a source of varying direct current signal, a second magnetic core forming a magnetic loop with a portion of said first core, an excitation winding on said second core adapted for varying the permeability of said magnetic loop, a source of bias coupled to said excitation winding for establishing a predetermined operating range wherein the rate of change of permeability is constant for the variation of the permeability in direct proportion to an excitation signal, and an excitation signal source coupled to said excitation winding for varying the permeability in said magnetic loop and thereby in said first magnetic core so that the flux caused in said first core by the varying direct current signal is modified in direct accordance with the excitation signal whereby a modulated signal is generated in said output winding, the modulated signal being a resultant of both the varying flux and permeability.

3. A magnetic device as claimed in claim 2 wherein said magnetic cores are arranged so that the flux caused by said excitation winding is ineffective at said input and output windings.

4. A magnetic device as claimed in claim 3 wherein said first magnetic core is a magnetic bridge.

5. A magnetic device as claimed in claim 4 wherein said magnetic cores are positioned in angular relationship.

6. A magnetic device as claimed in claim 4 wherein said source of bias is a direct current voltage source.

7. A magnetic device as claimed in claim 4 wherein said source of bias is a permanent magnet.

8. A magnetic device with controllably variable permeance comprising first and second magnetic cores, input and output windings coupled to each of said magnetic cores, a signal source coupled to said input windings, permanent magnets oppositely poled and coupled to said magnetic cores in a magnetically continuous circuit, a third magnetic core coupled to said permanent magnets in a magnetically continuous circuit to form magnetic loops with said first and second magnetic cores, an excitation winding on said third magnetic core adapted to vary the permeance of said magnetic loops, and an excitation signal source for energizing said excitation winding so that the flux generated by said input windings is influenced by the excitation signal whereby modulated signals are generated in said output windings.

9. A magnetic device as claimed in claim 8 wherein said permanent magnets are positioned between said first and second magnetic cores, said input windings being connected in series aiding arrangement, said output windings being connected in series opposing arrangement.

References Cited in the file of this patent

UNITED STATES PATENTS

| | | |
|---|---|---|
| 1,287,982 | Hartley | Dec. 17, 1918 |
| 2,103,996 | Bedford | Dec. 28, 1937 |
| 2,339,406 | Holden | Jan. 18, 1944 |
| 2,435,214 | Haug | Feb. 3, 1948 |
| 2,732,505 | Walker et al. | Jan. 24, 1956 |

FOREIGN PATENTS

| | | |
|---|---|---|
| 472,521 | Great Britain | Sept. 24, 1937 |

OTHER REFERENCES

"Electrical Engineering," November 1948, p. 1127, (Smith, Fig. 1).

"Magnetic Amplifier Circuits," Geyger, McGraw-Hill Book Co., Inc., 1st ed., N.Y., 1954, pp. 30–33.